US011444567B2

(12) United States Patent
Park et al.

(10) Patent No.: US 11,444,567 B2
(45) Date of Patent: Sep. 13, 2022

(54) APPARATUS AND METHOD FOR PROTECTING OVERCURRENT OF CLUTCH CONTROL SYSTEM

(71) Applicant: HYUNDAI AUTOEVER CORP., Seoul (KR)

(72) Inventors: Joon-Hyun Park, Seoul (KR); Jeong-Yong Eom, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 0 days.

(21) Appl. No.: 17/116,753

(22) Filed: Dec. 9, 2020

(65) Prior Publication Data

US 2021/0184619 A1   Jun. 17, 2021

(30) Foreign Application Priority Data

Dec. 12, 2019   (KR) .......................... 10-2019-0165898

(51) Int. Cl.
*H02P 27/06* (2006.01)
*H02P 29/024* (2016.01)

(52) U.S. Cl.
CPC ............ *H02P 29/027* (2013.01); *H02P 27/06* (2013.01)

(58) Field of Classification Search
CPC ........ H02P 29/032; H02P 27/08; H02P 27/06; H02P 29/027
See application file for complete search history.

(56) References Cited

U.S. PATENT DOCUMENTS

| 4,675,799 A * | 6/1987 | Suzuki ................. H02M 7/525 363/58 |
| 7,859,205 B2 * | 12/2010 | Mori ...................... H02P 27/08 318/379 |
| 2010/0208502 A1 * | 8/2010 | Horii ................ H02M 3/33507 363/131 |
| 2015/0115852 A1 * | 4/2015 | Lee ........................ H02H 3/006 318/400.22 |
| 2017/0365997 A1 * | 12/2017 | Kitamoto ................ H02H 9/02 |
| 2018/0145503 A1 * | 5/2018 | Minagawa .............. H02M 1/00 |
| 2021/0028614 A1 * | 1/2021 | Sugiyama ............ H02H 1/0007 |

FOREIGN PATENT DOCUMENTS

| JP | 2009-136105 A | 6/2009 |
| KR | 10-1339205 B1 | 12/2013 |
| KR | 10-2017-0139720 A | 12/2017 |

* cited by examiner

*Primary Examiner* — Thai T Dinh
(74) *Attorney, Agent, or Firm* — Morgan, Lewis & Bockius LLP

(57) ABSTRACT

Provided is an apparatus and method for protecting an overcurrent of a clutch control system including a motor, an inverter including a plurality of switching elements and configured to convert DC power into AC power by ON/OFF of the plurality of switching elements and to provide the AC power to the motor; a motor control unit configured to detect a current provided to the motor; and a microcomputer having an overcurrent threshold for overcurrent detection set for each of a predetermined number of levels, and configured to compare the detected current with the overcurrent threshold for each level, to diagnose whether there is a level corresponding to an overcurrent, to measure an overcurrent duration when there is a level corresponding to the overcurrent, and to control the inverter based on the overcurrent duration.

10 Claims, 6 Drawing Sheets

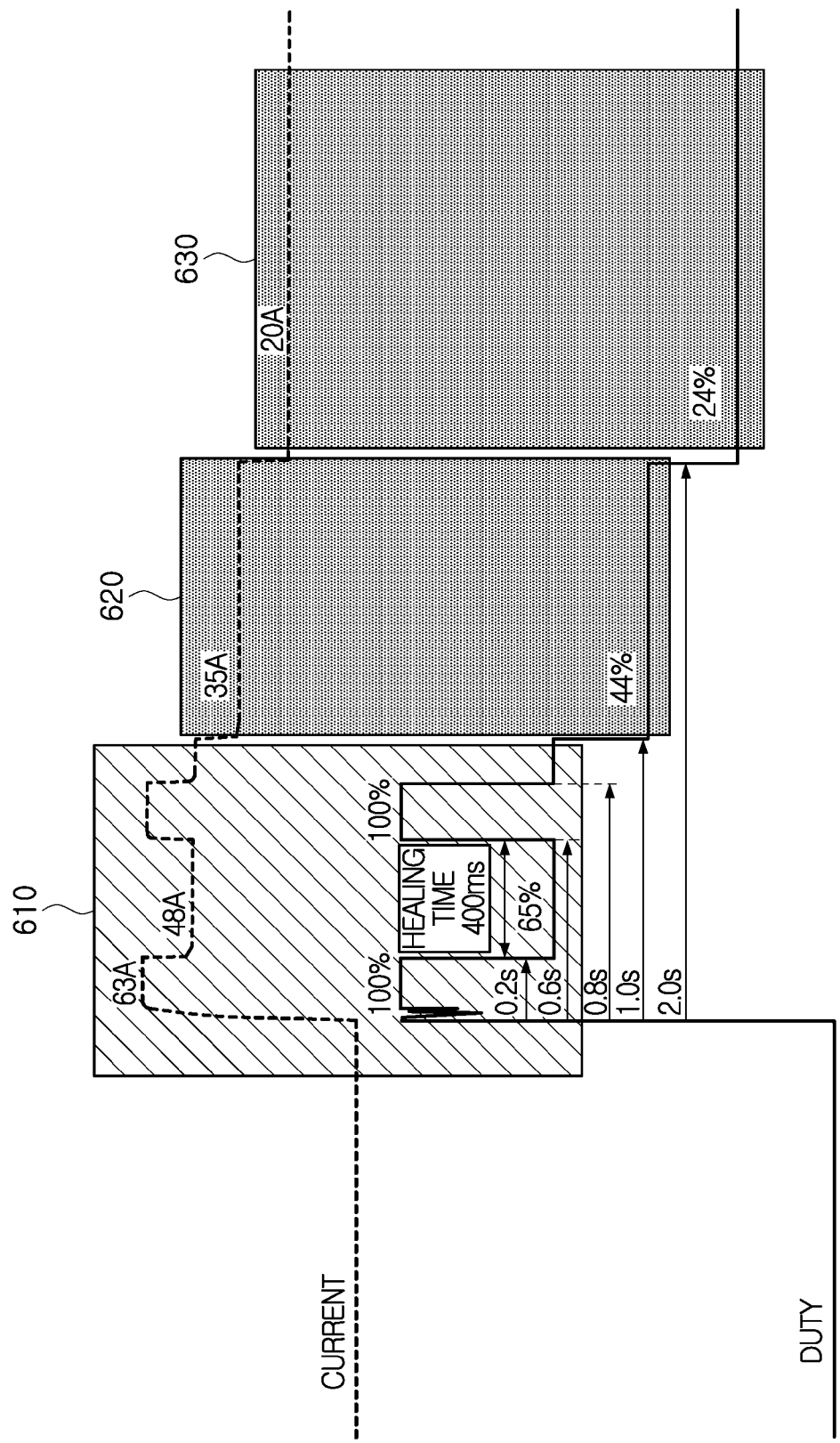

APPARATUS AND METHOD FOR PROTECTING OVERCURRENT OF CLUTCH CONTROL SYSTEM

CROSS-REFERENCE TO RELATED APPLICATION

This application claims priority from and the benefit of Korean Patent Application No. 10-2019-0165898, filed on Dec. 12, 2019, which is hereby incorporated by reference for all purposes as if set forth herein.

BACKGROUND

Field

Exemplary embodiments of the present disclosure relate to an apparatus and method for protecting an overcurrent of a clutch control system, and more particularly, to an apparatus and method for protecting an overcurrent of a clutch control system, capable of guaranteeing the safety and maximum performance of the clutch control system by dividing an overcurrent into a predetermined number of levels, monitoring and diagnosing the respective levels, and limiting a target duty in the process of diagnosing the respective levels.

Discussion of the Background

An iMT (eClutch) system is an eco-friendly control system that converts clutch control in a powertrain from existing hydraulic control to motor control. In this system, the amount of current used at a controller level is substantially the same as the amount of torque used at a system level, and the controller needs to use maximum torque in order to quickly reach a target position in a process in which the clutch is opened. This affects driver's riding comfort and gear shifting performance during starting and gear shifting. Accordingly, it is necessary to perform clutch open/close control by maximally utilizing the performance of a motor mounted on the controller of the clutch control system.

However, in the related powertrain motor control model, controller protection and overcurrent diagnosis have not been performed in consideration of safety compared to maximum performance. The current used for high-performance control affects the motor and the controller differently depending on the levels thereof. For example, when 60 A and 400 ms are substantially maintained, the controller may be normal, but the motor may be burned, and in the case of 30 A and 3 s, the motor may be normal, but the controller may be burned.

Furthermore, the clutch control system needs to continuously maintain the control of the motor, but when an overcurrent is applied so that a fault is diagnosed, it is not possible to operate the motor because a motor IC is turned off. Therefore, during high-speed travel, speed reduction and stopping are possible, but gear shifting is not possible, which imposes a heavy load on the system.

In this regard, there is a need to develop a technology capable of diagnosing each overcurrent and protecting the controller in consideration of different damage index regions of the motor and the controller.

The background art of the present disclosure is disclosed in Korean Patent Registration No. 10-1339205 (registered on Dec. 3, 2013 and entitled "Method and System for diagnosing Overcurrent of Oil Pump Control Unit of Hybrid Electric Vehicle").

SUMMARY

Various embodiments are directed to providing an apparatus and method for protecting an overcurrent of a clutch control system, capable of diagnosing each overcurrent and protecting a controller in consideration of different damage index regions of a motor and the controller.

Problems to be solved by the present disclosure are not limited to the aforementioned problem(s), and other unmentioned problems will be clearly understood by those skilled in the art from the following description.

In an embodiment, an apparatus for protecting an overcurrent of a clutch control system includes: a motor; an inverter including a plurality of switching elements and configured to convert DC power into AC power by ON/OFF of the plurality of switching elements and to provide the AC power to the motor; a motor control unit configured to detect a current provided to the motor; and a microcomputer having an overcurrent threshold for overcurrent detection set for each of a predetermined number of levels, and configured to compare the detected current with the overcurrent threshold for each level, to diagnose whether there is a level corresponding to an overcurrent, to measure an overcurrent duration when there is a level corresponding to the overcurrent, and to control the inverter based on the overcurrent duration.

In the present disclosure, the microcomputer may include an overcurrent diagnosis unit configured to compare the current with the overcurrent threshold for each level, to diagnose whether the current is an overcurrent, and to diagnose a level corresponding to the overcurrent; and an overcurrent protection unit configured to measure an overcurrent duration by operating a corresponding counter of the level corresponding to the overcurrent, and to limit a duty of a pulse width modulation signal for controlling the plurality of switching elements to a target duty set for the level when the overcurrent duration is equal to or more than a limit time set for the level.

In the present disclosure, the overcurrent protection unit may retain the target duty for a predetermined time based on the limit time, and then release the target duty limitation.

In the present disclosure, the overcurrent protection unit may determine the motor as a fault when the overcurrent duration is equal to or more than a fault diagnosis time set for the level.

In the present disclosure, the counter may set an up-count period for measuring the overcurrent duration to be different from a down-count period for measuring a time in a normal state after overcurrent diagnosis, and set the down-count period to be larger than the up-count period.

The apparatus for protecting an overcurrent of a clutch control system in accordance with an embodiment of the present disclosure can guarantee the safety and maximum performance of the clutch control system by dividing an overcurrent into a predetermined number of (for example, four) levels, monitoring and diagnosing the respective levels, and limiting a target duty in the process of diagnosing the respective levels.

Effects of the present disclosure are not limited to the aforementioned effects and may include various effects within the range obvious to those skilled in the art from the following description.

BRIEF DESCRIPTION OF THE DRAWINGS

FIG. 1 is a block diagram for explaining an apparatus for protecting an overcurrent of a clutch control system in accordance with an embodiment of the present disclosure.

FIG. 6 is a graph for explaining the method for protecting the overcurrent of the clutch control system in accordance with embodiments of the present disclosure.

DETAILED DESCRIPTION OF THE ILLUSTRATED EMBODIMENTS

Figure 1:
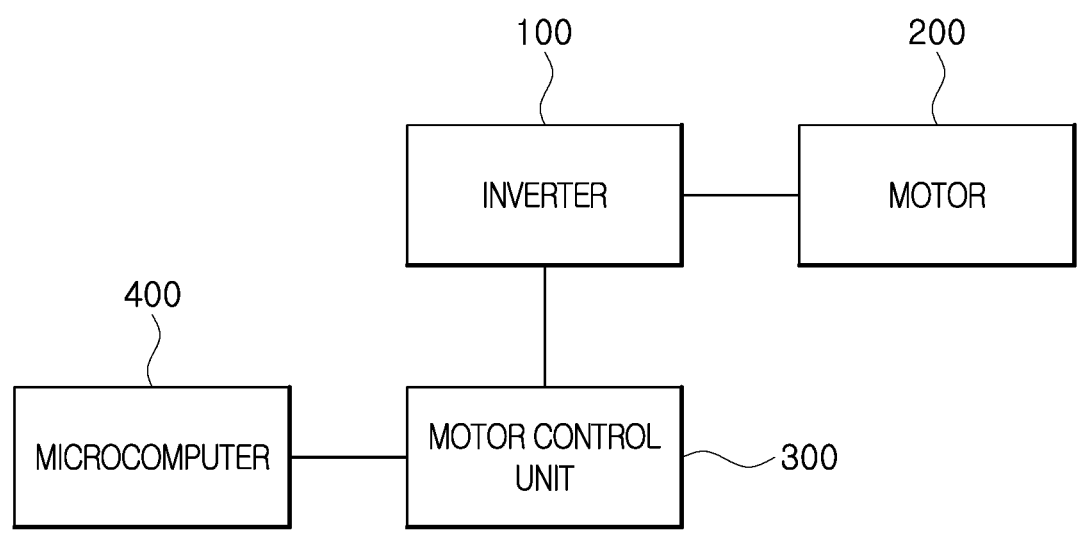

Hereinafter, an apparatus and method for protecting an overcurrent of a clutch control system in accordance with an embodiment of the present disclosure will be described below with reference to the accompanying drawings. In this process, the thicknesses of lines or the sizes of elements illustrated in the drawings may be exaggerated for the purpose of clarity and convenience of explanation.

Furthermore, terms to be described later are terms defined in consideration of functions thereof in the present disclosure and may be changed according to the intention of a user or an operator, or practice. Accordingly, such terms should be defined based on the disclosure over the present specification.

Figure 2:
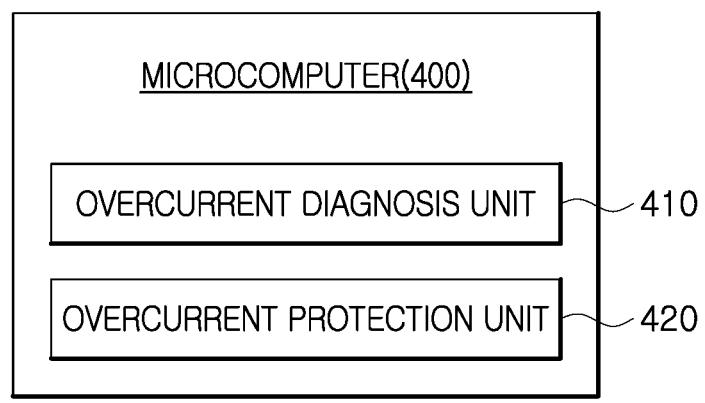
FIG. 2 is a more detailed block diagram illustrating a microcomputer illustrated in FIG. 1.

FIG. 1 is a block diagram for explaining an apparatus for protecting an overcurrent of a clutch control system in accordance with an embodiment of the present disclosure, and FIG. 2 is a more detailed block diagram illustrating a microcomputer illustrated in FIG. 1.

Referring to FIG. 1, the apparatus for protecting an overcurrent of a clutch control system in accordance with an embodiment of the present disclosure includes an inverter 100, a motor 200, a motor control unit 300, and a microcomputer 400.

The motor 200 is an element that receives 3-phase AC power provided from the inverter 100 and generates rotational force, and various types of motors known in the art may be employed.

The inverter 100 is an element that converts DC power stored in a power supply (for example, a battery) (not illustrated) into AC power for driving a motor, and may include a plurality of switching elements S1 to S6 whose on/off states are controlled by a pulse width modulation signal provided by the microcomputer 400.

The inverter 100 is composed of the plurality of switching elements, and the plurality of switching elements may be controlled in a pulse width modulation (PWM) scheme to generate the AC power. That is, the inverter 100 converts a DC voltage supplied from the power supply into a 3-phase AC voltage according to a control signal applied from the motor control unit 300, thereby driving the motor 200. The pulse width modulation signal used for controlling the switching element, which is included in in the inverter 100, in the pulse width modulation scheme has a predetermined period and has the form of a pulse whose high/low states are repeated, and a duty cycle or a duty ratio, which is a ratio of a high section of the pulse width modulation signal is controlled, so that the amount of power provided to the motor 200 may be adjusted.

The switching element constituting the inverter 100 may be composed of any one of an insulated gate bipolar transistor (IGBT), a MOSFET, a transistor, and a relay.

The inverter 100 includes a protection circuit. The protection circuit monitors the flow of power, and distributes or cuts off the power when an overvoltage or an overcurrent is introduced into a power source due to various causes such as a rear-end collision or a collision of a vehicle and lightning exposure, thereby protecting all systems provided in a hybrid vehicle and stably protecting occupants from high pressure.

The motor control unit 300 outputs a 3-phase motor driving signal according to a duty value of a PWM control signal outputted from the microcomputer 400.

Furthermore, the motor control unit 300 detects a current provided to the motor 200 and outputs the detected current to the microcomputer 400.

The microcomputer 400 is provided to control the inverter 100, and may adjust the output of the motor 200 by switching the switching elements S1 to S6 in the inverter 100 in the pulse width modulation scheme.

Basically, in order to control the torque of the motor 200 to have a desired value, the microcomputer 400 may perform pulse width modulation control of appropriately adjusting the duty cycles (duty ratios) of the switching elements S1 to S6 of the inverter 100.

Furthermore, an overcurrent threshold for overcurrent detection is set for each of a predetermined number of levels, and the microcomputer 400 compares the current detected by the motor control unit 300 with the overcurrent threshold for each level, diagnoses whether there is an overcurrent at each level, measures an overcurrent duration when there is a level diagnosed as the overcurrent, and controls the inverter 100 based on the overcurrent duration. In such a case, the microcomputer 400 may limit the duty of the pulse width modulation signal supplied to the switching elements of the inverter 100 to a target duty set for the corresponding level, based on the overcurrent duration. For each level, an overcurrent threshold, an allowable time of the overcurrent threshold, a limit time for current limit, and a fault diagnosis time for diagnosing a fault condition may be set. The limit time may be shorter than the allowable time, for example, ½ of the allowable time, and the fault diagnosis time may be equal to or more than the allowable time.

For example, in the microcomputer 400, the overcurrent thresholds for overcurrent detection may be set for four levels (a first level, a second level, a third level, and a fourth level), respectively. That is, a first overcurrent threshold may be set for the first level, a second overcurrent threshold may be set for the second level, a third overcurrent threshold may be set for the third level, a fourth overcurrent threshold may be set for the fourth level, and the overcurrent thresholds may have values different from one another. Furthermore, for each of the first level, the second level, the third level, and the fourth level, an allowable time of a corresponding overcurrent threshold, a limit time, and a fault diagnosis time may be set. That is, a first allowable time of the first overcurrent threshold, a first limit time, and a first fault diagnosis time may be set, and a second allowable time of the second overcurrent threshold, a second limit time, and a second fault diagnosis time may be set. Furthermore, a third allowable time of the third overcurrent threshold, a third limit time, and a third fault diagnosis time may be set, and a fourth allowable time of the fourth overcurrent threshold, a fourth limit time, and a fourth fault diagnosis time may be set. Here, when the value increases in the order of the first overcurrent threshold to the fourth overcurrent threshold, the value may decrease in the order of the first allowable time (the first limit time and the first fault diagnosis time) to the fourth allowable time, or vice versa.

Accordingly, the microcomputer 400 may compare the current detected by the motor control unit 300 with each of the first overcurrent threshold, the second overcurrent threshold, the third overcurrent threshold, and the fourth overcurrent threshold. As the comparison results, when the detected current is equal to or more than the third overcurrent threshold and the fourth overcurrent threshold, the microcomputer 400 may diagnose the detected current as an overcurrent at the third level and the fourth level. In such a case, the microcomputer 400 may operate counters (not illustrated) of the third level and the fourth level, respectively, thereby measuring a third overcurrent duration, which is an overcurrent duration at the third level, and a fourth overcurrent duration which is an overcurrent duration at the fourth level. The microcomputer 400 may compare the third overcurrent duration with the third limit time, compare the fourth overcurrent duration with the fourth limit time, and control the duty of the pulse width modulation signal according to the comparison results. For example, when the third overcurrent duration is equal to or more than the third limit time, the microcomputer 400 may control the duty of the pulse width modulation signal. When the fourth overcurrent duration is equal to or more than the fourth limit time, the microcomputer 400 may control the duty of the pulse width modulation signal.

Such a microcomputer 400 is one or more microprocessors operating by a set program or hardware including the microprocessor, and the set program may be formed as a series of commands for controlling the duty of the pulse width modulation signal in accordance with an embodiment of the present disclosure, which is to be described below.

As illustrated in FIG. 2, the microcomputer 400 may include an overcurrent diagnosis unit 410 and an overcurrent protection unit 420.

The overcurrent diagnosis unit 410 compares the detected current with the overcurrent threshold for each level, diagnoses whether the detected current is an overcurrent, and diagnoses a level corresponding to the overcurrent.

The overcurrent protection unit 420 measures an overcurrent duration by operating a counter of a level diagnosed as the overcurrent by the overcurrent diagnosis unit 410, and limits the duty of the pulse width modulation signal to a target duty set for the level when the overcurrent duration is equal to or more than a limit time set for the level.

For example, the overcurrent diagnosis unit 410 may compare the detected current with each of the first overcurrent threshold, the second overcurrent threshold, the third overcurrent threshold, and the fourth overcurrent threshold. As the comparison results, when the detected current is equal to or more than the third overcurrent threshold and the fourth overcurrent threshold, the overcurrent diagnosis unit 410 may diagnose the detected current as an overcurrent at the third level and the fourth level. In such a case, the overcurrent protection unit 420 may measure each of the third overcurrent duration of the third level and the fourth overcurrent duration of the fourth level. Then, when the third overcurrent duration is equal to or more than the third limit time, the overcurrent protection unit 420 may limit the duty of the pulse width modulation signal to a third target duty set for the third level. Furthermore, when the fourth overcurrent duration is equal to or more than the fourth limit time, the overcurrent protection unit 420 may limit the duty of the pulse width modulation signal to a fourth target duty set for the fourth level.

Furthermore, the overcurrent protection unit 420 may retain the target duty for a predetermined time set in advance after the target duty limitation, and release the target duty limitation after the target duty retention time. The predetermined time may be substantially the same as the target duty retention time, and for example, may be an arbitrarily set time such as twice the limit time. Furthermore, the target duty retention time may be referred to as a healing time and the healing time may indicate a time required for transitioning to a normal state.

Furthermore, the overcurrent protection unit 420 may determine a fault when the overcurrent duration is equal to or more than a fault diagnosis time set for a corresponding level. For example, when the fourth overcurrent duration is equal to or more than the fourth fault diagnosis time, the overcurrent protection unit 420 may determine a fault.

As described above, the apparatus for protecting an overcurrent can guarantee the safety and maximum performance of the clutch control system by dividing an overcurrent into a predetermined number of (for example, four) levels, monitoring and diagnosing the respective levels, and limiting a target duty in the process of diagnosing the respective levels.

The embodiment of the present disclosure has described that the overcurrent is divided into four levels and substantially the same motor is monitored and diagnosed; however, in a system using four motors 200 such as DCT, monitoring of each of the motors 200 is also possible.

Figure 3:
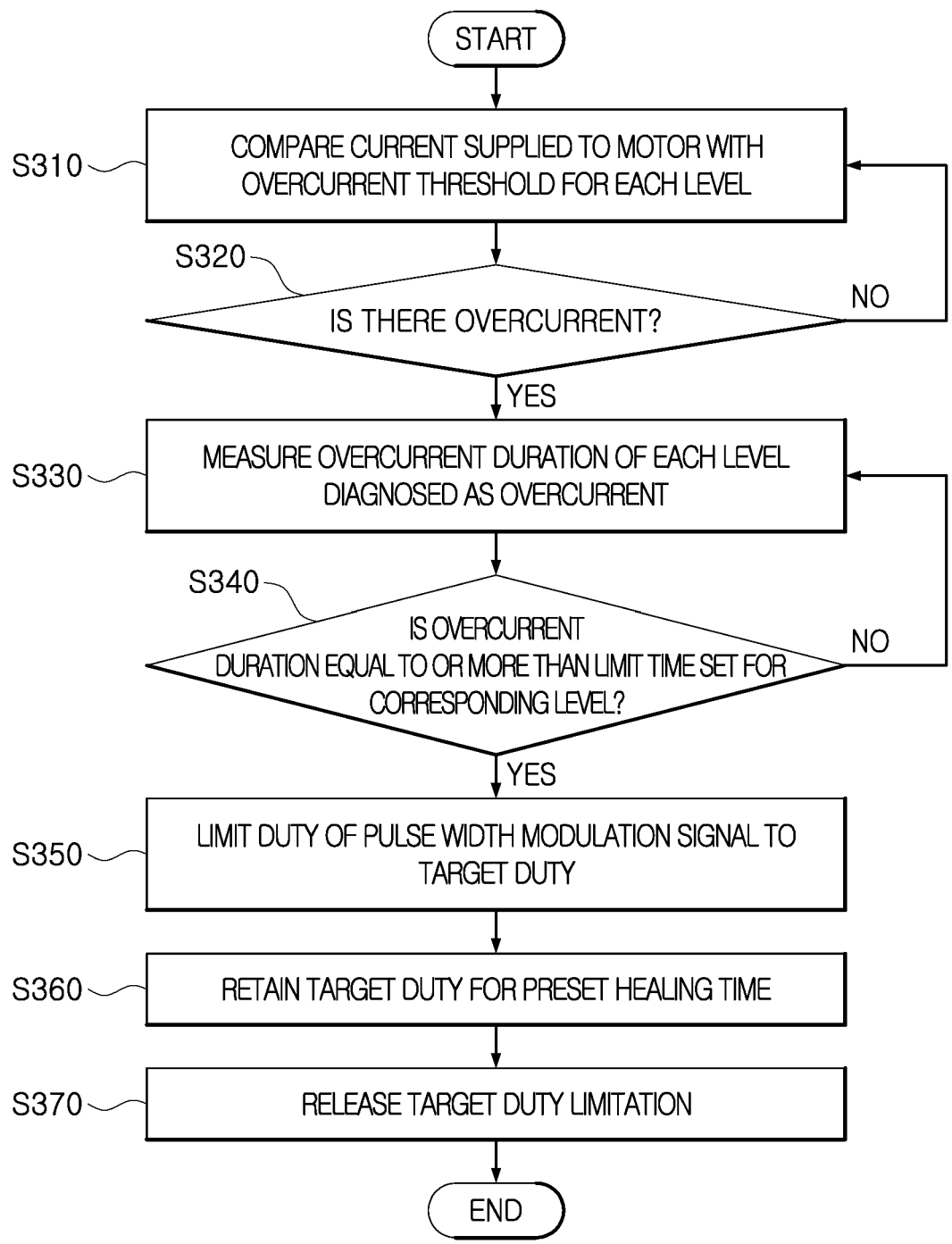
FIG. 3 is a flowchart for explaining a method for protecting the overcurrent of the clutch control system in accordance with embodiments of the present disclosure.
Figure 4:
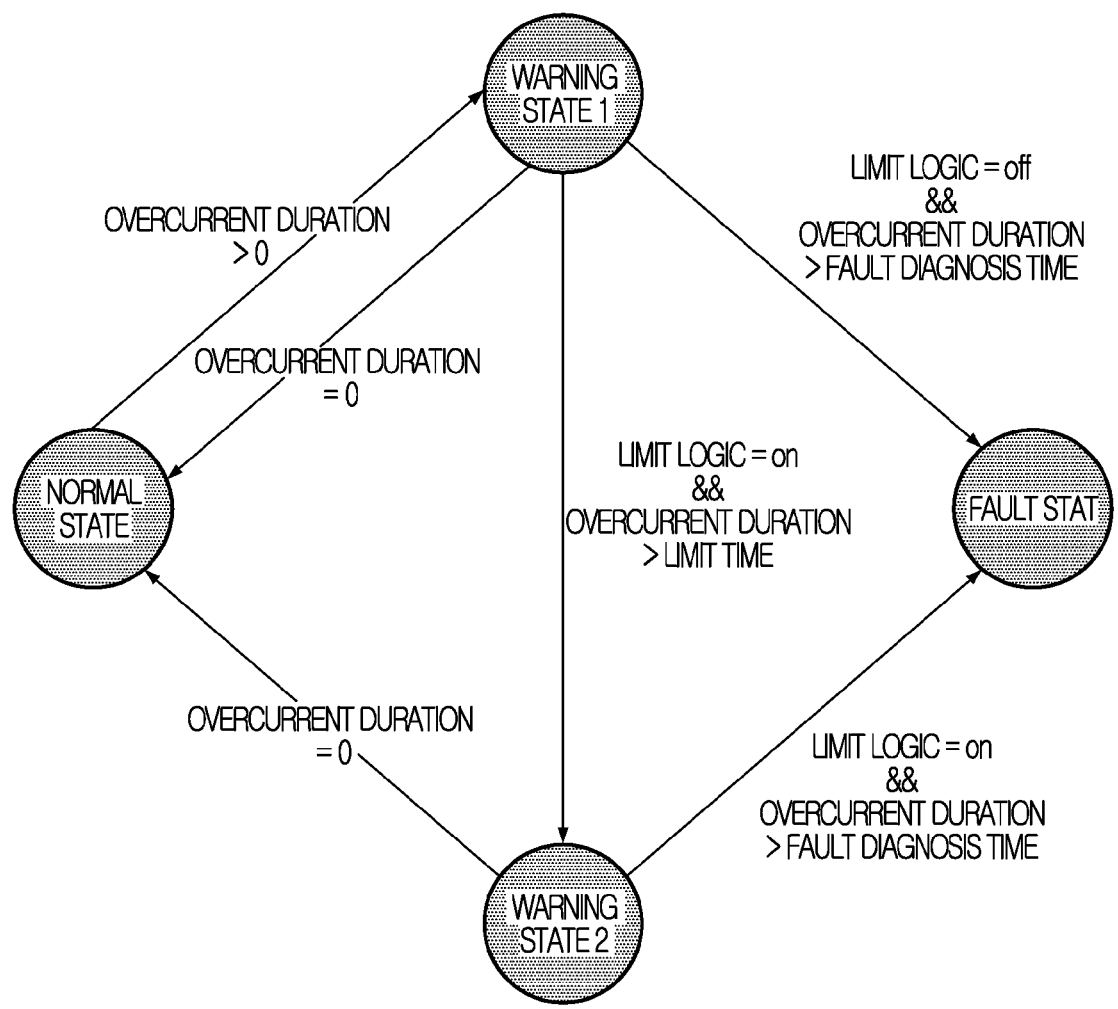
FIG. 4 is a status diagram for explaining the method for protecting the overcurrent of the clutch control system in accordance with embodiments of the present disclosure.

FIG. 3 is a flowchart for explaining a method for protecting the overcurrent of the clutch control system in accordance with embodiments of the present disclosure, and FIG. 4 is a status diagram for explaining the method for protecting the overcurrent of the clutch control system in accordance with embodiments of the present disclosure.

Referring to FIG. 3, the microcomputer 400 compares a current supplied to the motor 200 with a preset overcurrent threshold for each level (S310), and diagnoses whether there is an overcurrent at each level (S320). That is, the microcomputer 400 may compare the current supplied to the motor 200 with each of the overcurrent thresholds set for the respective levels, and determine whether there is a level at which the current is equal to or more than the overcurrent threshold.

As the diagnosis result in step S320, when there is the level diagnosed as an overcurrent, the microcomputer 400 measures an overcurrent duration of the level diagnosed as the overcurrent (S330). In such a case, when the number of levels diagnosed as the overcurrent is 2 or more, the microcomputer 400 may measure each of the overcurrent durations of the levels diagnosed as the overcurrent.

When step S330 is performed, the microcomputer 400 determines whether the overcurrent duration is equal to or more than a limit time set for the level (S340). That is, the microcomputer 400 may compare the overcurrent duration measured for each level with the limit time set for the level, and determine whether there is a level whose the overcurrent duration is equal to or more than the limit time of the level.

As the determination result of S340, when there is the level at which the overcurrent duration is equal to or more than the limit time, the microcomputer 400 limits the duty of the pulse width modulation signal to a target duty set for the level (S350).

When step S350 is performed, the microcomputer 400 retains the target duty for a preset healing time (S360), and releases the target duty limitation after the target duty retention time.

The aforementioned method for protecting the overcurrent may be described by the state diagram illustrated in FIG. 4. In FIG. 4, a normal state may indicate a state in which the current supplied to the motor 200 is smaller than the overcurrent threshold for each level, and a warning state 1 may indicate a state in which the current is diagnosed as the overcurrent and the overcurrent duration is smaller than the limit time. A warning state 2 may indicate a state in which the current is diagnosed as the overcurrent, the overcurrent duration is equal to or more than the limit time, and the duty control of the pulse width modulation signal has been performed. A fault state may indicate a state in which the overcurrent duration is equal to or more than the fault diagnosis time. The warning state 1 and the warning state 2 may return to the normal state when the overcurrent duration is '0'.

Figure 5:
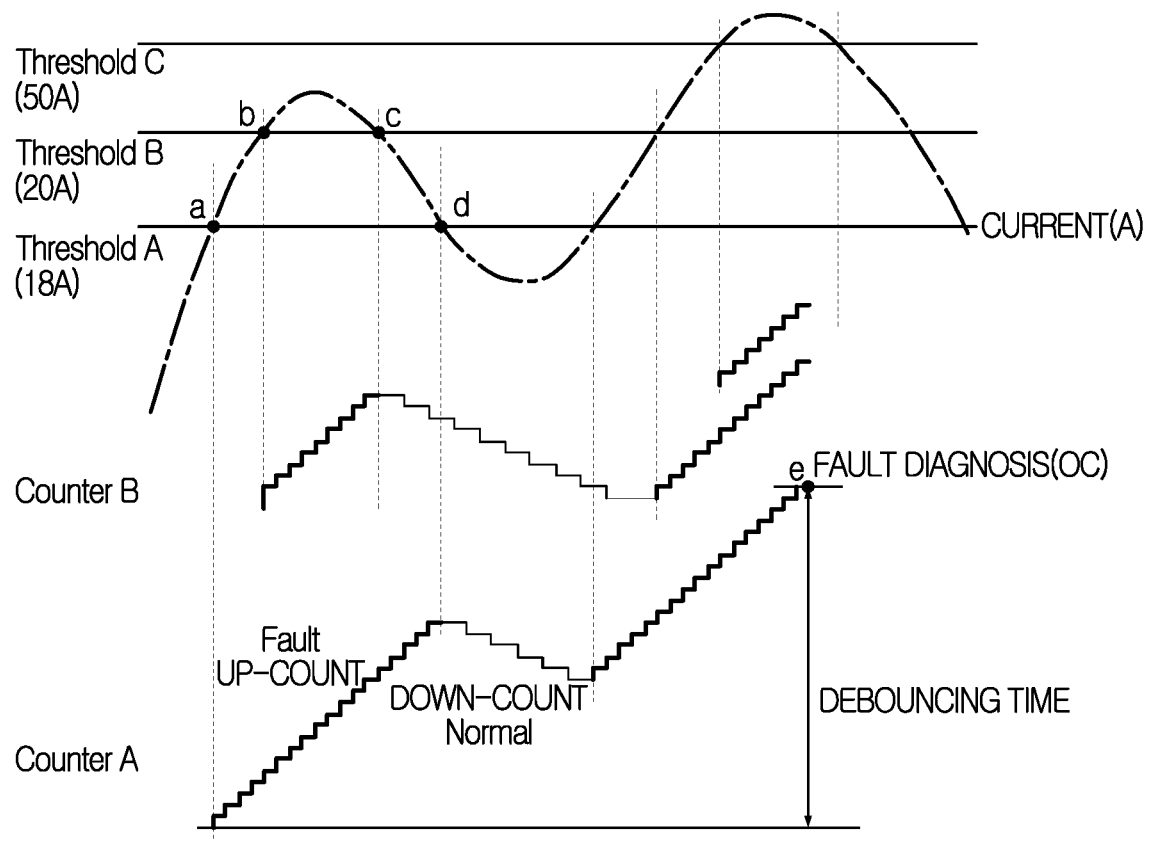
FIG. 5 is a graph for explaining a method for diagnosing the overcurrent of the clutch control system in accordance with embodiments of the present disclosure.

FIG. 5 is a graph for explaining a method for diagnosing the overcurrent of the clutch control system in accordance with embodiments of the present disclosure.

FIG. 5 illustrates a case where the overcurrent thresholds for overcurrent detection are set for three levels, that is, Threshold A (18 A), Threshold B (20 A), and Threshold C (50 A). In such a case, since a current at 'a' is equal to or more than Threshold A (18 A), the microcomputer 400 may diagnose the current as an overcurrent corresponding to the first level, and measure the first overcurrent duration by operating Counter A. In such a case, Counters B and C, other than Counter A, may not operate.

Furthermore, since the current at 'b' is equal to or more than Threshold B (20 A), the microcomputer 400 may diagnose the current as an overcurrent corresponding to the first level and the second level, and measure the second overcurrent duration by operating Counter B. In such a case, Counter A may continuously measure the first overcurrent duration and Counter C may not operate.

Furthermore, since the current at 'c' is smaller than Threshold B (20 A), the microcomputer 400 may diagnose the second level as the normal state, and down-count Counter B. In such a case, since the first level is in an overcurrent state, Counter A may continuously measure the first overcurrent duration.

Furthermore, since the current at 'd' is smaller than Threshold A (18 A), the microcomputer 400 may diagnose the first level as the normal state, and down-count Counter A. In such a case, since the first level is in an overcurrent state, Counter A may continuously measure the first overcurrent duration.

Furthermore, when the first overcurrent duration is equal to or more than the first limit time as in 'e', the microcomputer 400 may determine a fault.

As described above, the microcomputer 400 may up-count the counter to measure the overcurrent duration in the case of the overcurrent state Fault, and down-count the counter in the case of the normal state Normal. In such a case, the microcomputer 400 may set the up-count period for measuring the overcurrent duration to be different from the down-count period for measuring the time in the normal state after the overcurrent diagnosis. That is, the microcomputer 400 may set the down-count period to be larger than the up-count period. For example, the microcomputer 400 may set the down-count period to be twice the up-count period.

FIG. 6 is a graph for explaining the method for protecting overcurrent of the clutch control system in accordance with embodiments of the present disclosure.

Referring to FIG. 6, a first region 610 is a region where the third overcurrent threshold is equal to or more than 55 A, and the target duty after the third limit time of 200 ms may be limited to 65%. Then, the current may be limited to 48 A. When the healing time of 400 ms (200 ms*2) lapses after the target duty limitation, the duty limitation may be released. Then, the current of 55 A or more may be retained again for the third limit time of 200 ms and then the target duty may be limited to 65%.

A second region 620 is a region where the second overcurrent threshold is equal to or more than 40 A, and the target duty after the second limit time of 1,000 ms may be limited to 44%.

A third region 630 is a region where the first overcurrent threshold is equal to or more than 30 A, and the target duty after the first limit time of 2,000 ms may be limited to 24%.

As described above, the apparatus for protecting an overcurrent of a clutch control system in accordance with an embodiment of the present disclosure can guarantee the safety and maximum performance of the clutch control system by dividing an overcurrent into a predetermined number of (for example, four) levels, monitoring and diagnosing the respective levels, and limiting a target duty in the process of diagnosing the respective levels.

Although the present disclosure has been described with reference to the embodiments illustrated in the drawings, the embodiments of the disclosure are for illustrative purposes only, and those skilled in the art will appreciate that various modifications and other equivalent embodiments are possible therefrom.

Thus, the true technical scope of the present disclosure should be defined by the following claims.

What is claimed is:

1. An apparatus for protecting an overcurrent of a clutch control system, the apparatus comprising:
    a motor;
    an inverter including a plurality of switching elements and configured to convert DC power into AC power by ON/OFF of the plurality of switching elements and to provide the AC power to the motor;
    a motor control unit configured to detect a current provided to the motor; and
    a microcomputer having an overcurrent threshold for overcurrent detection set for each of a predetermined number of levels, and configured to compare the detected current with the overcurrent threshold for each level, to diagnose whether there is a level corresponding to an overcurrent, to measure an overcurrent duration when there is a level corresponding to the overcurrent, and to control the inverter based on the overcurrent duration,
    wherein the microcomputer is further configured to measure an overcurrent duration by operating a corresponding counter of the level corresponding to the overcurrent, and to limit a duty of a pulse width modulation signal for controlling the plurality of switching elements to a target duty set for the level when the overcurrent duration is equal to or more than a limit time set for the level.

2. The apparatus according to claim 1, wherein the microcomputer is further configured to compare the current with the overcurrent threshold for each level, to diagnose whether the current is an overcurrent, and to diagnose a level corresponding to the overcurrent.

3. The apparatus according to claim 1, wherein the microcomputer retains the target duty for a predetermined time based on the limit time, and releases the target duty limitation.

4. The apparatus according to claim 1, wherein the microcomputer determines the motor as a fault when the overcurrent duration is equal to or more than a fault diagnosis time set for the level.

5. The apparatus according to claim 1, wherein the counter sets an up-count period for measuring the overcurrent duration to be different from a down-count period for measuring a time in a normal state after overcurrent diagnosis, and sets the down-count period to be larger than the up-count period.

6. A method for protecting an overcurrent of a clutch control system, the method comprising:
    comparing a current provided to a motor with an overcurrent threshold for each level, to diagnose whether there is a level corresponding to an overcurrent, wherein the overcurrent threshold for overcurrent detection is set for each of a predetermined number of levels; and
    measuring an overcurrent duration when there is a level corresponding to the overcurrent; and
    controlling an inverter, which is configured to drive the motor, based on the overcurrent duration,
    wherein the controlling the inverter comprising:
    measuring the overcurrent duration by operating a corresponding counter of the level corresponding to the overcurrent; and
    limiting a duty of a pulse width modulation signal for controlling a plurality of switching elements of the inverter to a target duty set for the level when the overcurrent duration is equal to or more than a limit time set for the level.

7. The method according to claim 6, the method further comprising:
    retaining the target duty for a predetermined time based on the limit time, and releasing the target duty limitation.

8. The method according to claim 6, wherein the limiting the duty of the pulse width modulation signal to the target duty set for the level comprising:
    determining the motor as a fault when the overcurrent duration is equal to or more than a fault diagnosis time set for the level to the target duty set for the level.

9. The method according to claim 6, wherein the counter sets an up-count period for measuring the overcurrent duration to be different from a down-count period for measuring a time in a normal state after overcurrent diagnosis, and sets the down-count period to be larger than the up-count period.

10. A method for protecting an overcurrent of a clutch control system, the method comprising:
    comparing a current provided to a motor with an overcurrent threshold for each level, to diagnose whether there is a level corresponding to an overcurrent, wherein the overcurrent threshold for overcurrent detection set for each of a predetermined number of levels; and
    measuring an overcurrent duration when there is a level corresponding to the overcurrent; and
    controlling an inverter, which is configured to drive the motor, based on the overcurrent duration,
    wherein the controlling the inverter comprises:
        limiting a duty of a pulse width modulation signal for controlling a plurality of switching elements of the inverter to a target duty set for the level when the overcurrent duration is equal to or more than a limit time set for the level, and
    wherein the limiting the duty of the pulse width modulation signal to the target duty set for the level comprises:
        determining the motor as a fault when the overcurrent duration is equal to or more than a fault diagnosis time set for the level to the target duty set for the level.

* * * * *